United States Patent
Goto et al.

(10) Patent No.: US 6,836,363 B2
(45) Date of Patent: Dec. 28, 2004

(54) REAR PROJECTION SCREEN AND REAR PROJECTION TYPE DISPLAY INCLUDING THE SAME

(75) Inventors: Masahiro Goto, Shinjuku-Ku (JP); Hiroshi Sekiguchi, Shinjuku-Ku (JP)

(73) Assignee: Dai Nippon Printing Co., Ltd. (JP)

(*) Notice: Subject to any disclaimer, the term of this patent is extended or adjusted under 35 U.S.C. 154(b) by 0 days.

(21) Appl. No.: 10/350,174

(22) Filed: Jan. 24, 2003

(65) Prior Publication Data

US 2003/0137729 A1 Jul. 24, 2003

(30) Foreign Application Priority Data

Jan. 24, 2002 (JP) ......................................... 2002-015537

(51) Int. Cl.[7] ................................................. G03B 21/56
(52) U.S. Cl. ........................ 359/460; 359/456; 359/457; 359/453
(58) Field of Search ............................... 359/460, 453, 359/455, 456, 457, 443, 448, 742

(56) References Cited

U.S. PATENT DOCUMENTS 5,513,037 A * 4/1996 Yoshida et al. ............. 359/457
5,903,399 A * 5/1999 Yamashita et al. .......... 359/742
6,282,034 B1 * 8/2001 Onishi et al. ............... 359/742
6,295,162 B1 * 9/2001 Miyata ....................... 359/453
6,407,859 B1 * 6/2002 Hennen et al. .............. 359/454
6,665,118 B2 * 12/2003 Yamaguchi et al. ......... 359/453
2002/0109915 A1 * 8/2002 Mori et al. .................. 359/455

FOREIGN PATENT DOCUMENTS

JP          5-158153          6/1993

* cited by examiner

Primary Examiner—Ricky Mack
Assistant Examiner—Brandi Thomas
(74) Attorney, Agent, or Firm—Parkhurst & Wendel, L.L.P.

(57) ABSTRACT

A rear projection screen 3 includes a single Fresnel lens sheet 11 having the function of converging projected light entering from its back side and allowing the converged light to emerge from its observation side, or a combination of the Fresnel lens sheet 11 provided on the back side and a lenticular lens sheet 21 provided on the observation side. The Fresnel lens sheet 11 has a Fresnel lens 12 on its observation-side surface and a matte surface 13 as its back-side surface. The matte surface 13 of the Fresnel lens sheet 11 has a specified degree of matting and shows antireflection properties. Preferably, the Fresnel lens sheet 11 has a haze value in a specified range. More preferably, the matte surface 13 of the Fresnel lens sheet 11 has a gloss in a specified range.

21 Claims, 2 Drawing Sheets

REAR PROJECTION SCREEN AND REAR PROJECTION TYPE DISPLAY INCLUDING THE SAME

BACKGROUND OF THE INVENTION

1. Field of the Invention

The present invention relates to a rear projection screen including a Fresnel lens sheet. More particularly, the present invention relates to a rear projection screen capable of displaying sharp images without producing ghost or double images, and to a rear projection type display including such a rear projection screen.

2. Description of Related Art

So-called rear projection type displays, which include rear projection screens on which light (imaging light) is projected from their back sides, are known as displays having large-sized screens.

As shown in FIG. 3, a conventional rear projection type display 101 is composed of: a rear projection screen 103; a projector 105 for projecting light 106 on the rear projection screen 103; and a reflector 104 for reflecting the projected light 106 into the back-side surface of the rear projection screen 103. The rear projection screen 103, the projector 105 and the reflector 104, which are positioned as shown in FIG. 3, are contained within a cabinet 102. Namely, the rear projection screen 103 is set in a bored window made in the upper part of the front (observation-side) surface of the cabinet 102, and the projector 105 is placed at the lower part in the cabinet 102. The reflector 104 is placed at the upper part in the cabinet 102 so that it can reflect the light 106 projected from the projector 105, into the back-side surface of the rear projection screen 103.

FIG. 4 is a view showing a typical rear projection screen 103 for use in the rear projection type display 101 shown in FIG. 3. As shown in this drawing, the typical rear projection screen 103 includes a Fresnel lens sheet 111 on its back side and a lenticular lens sheet 121 on its observation side. The Fresnel lens sheet 111 and the lenticular lens sheet 121 are positioned in close proximity in the rear projection screen 103; in general, they are closely fitted. The Fresnel lens sheet 111 has a Fresnel lens 112 on its observation-side surface and a flat surface 114 as its back-side surface. The lenticular lens sheet 121 has lenticular lenses 122 on its back-side surface (the surface facing to the Fresnel lens sheet 111) arranged so that grooves will be vertically formed between the lenticular lenses. Further, on the observation-side surface of the lenticular lens sheet 121, black stripes 123 for preventing the reflection of light entering from the observation side of the lenticular lens sheet 121 are formed on those parts corresponding to the non-light-converging parts of the lenticular lenses 122 provided on the back-side surface of the lenticular lens sheet 121.

In the rear projection type display 101 having the above-described arrangements, when light 106 projected from the projector 105 is reflected from the reflector 104 into the back-side surface of the rear projection screen 103, most of the incident light passes through the rear projection screen 103 and becomes imaging light 107. However, the back-side surface of the rear projection screen 103 reflects a part of the incident light, and the reflector 104 reflects this reflected light 108 into the rear projection screen 103. The reflected light 108 thus re-enters into the rear projection screen 103 at the point different from the one at which the projected light 106 has firstly entered, and finally emerges as ghost light 109 from the observation side. For this reason, when the rear projection screen 103 in the rear projection type display 101 is observed, ghost images are seen in addition to the properly reflected image in a position deviated from that of the properly reflected image. Such ghost images tend to appear when the optical path length between the projector 105 and the rear projection screen 103 (i.e., projection distance) is shorter and when the distance between the rear projection screen 103 and the reflector 104 is shorter. The appearance of ghost images is therefore a big problem encountered in attempts to make the rear projection type display 101 thinner.

A conventionally proposed measure for preventing the appearance of ghost images is such that an antireflection layer is formed on the back-side surface of a rear projection screen. With this measure, however, it is difficult to perfectly prevent the appearance of ghost images although it is possible to make the intensity of ghost images lower. Moreover, it is necessary to conduct vacuum deposition or the like to form an antireflection layer on the back-side surface of a rear projection screen. This process is poor in production efficiency, so that the above-described measure is inadequate from an industrial point of view.

On the other hand, Japanese Laid-Open Patent Publication No. 158153/1993 discloses the following measure of preventing the appearance of ghost images: the back-side surface of a Fresnel lens sheet to be used for a rear projection screen is roughened by forming crepe finish, hair lines, lenticular lenses or the like; in particular, lenticular lenses are provided in such a direction that grooves will be horizontally formed between the lenticular lenses. However, if the back-side surface of a Fresnel lens sheet is simply roughened in the manner as disclosed in this publication, the projected image tends to have lowered definition and contrast. Moreover, the formation of lenticular lenses on the back-side surface of a Fresnel lens sheet promotes the appearance of a moire pattern.

SUMMARY OF THE INVENTION

The present invention was accomplished in the light of the foregoing drawbacks in the related art. Namely, an object of the present invention is to provide a rear projection screen that can effectively prevent the appearance of ghost images which is caused by projected light reflected from the back-side surface of the rear projection screen, that can be excellent in production efficiency, that can display an image having satisfactorily high definition and contrast, and that does not promote the appearance of moire patterns; and a rear projection type display including such a rear projection screen.

Another object of the present invention is to provide a rear projection screen that scarcely undergoes curling, which leads to the lowering of image definition, with changes in environmental conditions such as change in humidity; and a rear projection type display including such a rear projection screen.

The present invention provides a rear projection screen comprising a Fresnel lens sheet that converges projected light entering from a back side thereof and allows the converged light to emerge from an observation side thereof, wherein the Fresnel lens sheet has an observation-side surface forming a Fresnel lens and a back-side surface forming a matte surface.

In the present invention, the Fresnel lens sheet preferably has a haze value defined in JIS (Japanese Industrial Standards) K7105 of 15 to 40%. Further, the matte surface of the Fresnel lens sheet preferably has a 60° specular gloss defined in JIS K 7105 of 20 to 45% and a 20° specular gloss defined in JIS K7105 of 5 to 15%.

Further, in the present invention, it is preferable that the Fresnel lens sheet includes a cured material layer formed by curing an ionizing-radiation-curing resin and a transparent substrate sheet laminated to the cured material layer; the Fresnel lens is formed in the cured material layer; and at least a surface of the transparent substrate sheet not facing to the cured material layer is matted to give the matte surface.

Furthermore, in the present invention, the transparent substrate sheet in the Fresnel lens sheet preferably shows a water absorption of not more than 0.2% when determined by immersing it in water at 23° C. for 24 hours under JIS K7209.

Furthermore, in the present invention, the Fresnel lens sheet preferably has a thickness between 0.2 mm and 1.5 mm.

Furthermore, in the present invention, it is preferable to subject the matte surface of the Fresnel lens sheet to anti-static treatment.

Moreover, it is preferable that the rear projection screen of the present invention further comprises a lenticular lens sheet on the observation side of the Fresnel lens sheet.

The present invention further provides a rear projection type display comprising: the above-described rear projection screen; a projector that projects light on the rear projection screen; and a reflector that reflects the projected light into the back-side surface of the rear projection screen.

According to the present invention, since the Fresnel lens sheet has a matte surface as its back-side surface, it is possible to effectively prevent the appearance of ghost images that is caused by projected light reflected from the back-side surface of the Fresnel lens sheet.

Further, according to the present invention, in the case where the haze value defined in JIS K7105 of the Fresnel lens sheet is made 15–40%, it becomes possible to effectively prevent the lowering of image definition and contrast.

Furthermore, according to the present invention, in the case where the 600 specular gloss defined in JIS K7105 of the matte surface of the Fresnel lens sheet is made 20–45%, the image contrast is not greatly lowered; in addition, the appearance of ghost images is more effectively prevented because such a matte surface can ensure the reflecting properties of light that is re-reflected from a reflector or the like and enters into the Fresnel lens sheet at a large angle.

Furthermore, according to the present invention, in the case where the 20° specular gloss defined in JIS K7105 of the matte surface of the Fresnel lens sheet is made 5–15%, it becomes possible to restrain the reflection of light that enters into the Fresnel lens sheet almost vertically, so that the image contrast is not greatly lowered.

Furthermore, according to the present invention, in the case where the Fresnel lens sheet is made from a cured material layer formed by curing an ionizing-radiation-curing resin and a transparent substrate sheet to separately form a layer having a Fresnel lens and a layer having a matte surface, each layer can fully show its function; in addition, improvement in production efficiency can be attained.

Furthermore, according to the present invention, in the case where the water absorption of the transparent substrate sheet in the Fresnel lens sheet as determined by immersing the transparent substrate sheet in water at 23° C. for 24 hours under JIS K7209 is made not more than 0.2%, the Fresnel lens sheet scarcely undergoes curling with changes in environmental conditions such as change in humidity, so that the lowering of image definition hardly occurs.

Moreover, according to the present invention, in the case where the thickness of the Fresnel lens sheet is made between 0.2 mm and 1.5 mm, it becomes possible to prevent the Fresnel lens sheet from curling and to effectively prevent the appearance of double images that is caused at the lower part of the Fresnel lens sheet.

In addition, according to the present invention, in the case where the matte surface of the Fresnel lens sheet is subjected to antistatic treatment, it becomes possible to improve both anti-dusting and anti-staining properties.

DETAILED DESCRIPTION OF PREFERRED EMBODIMENTS

By referring to the accompanying drawings, embodiments of the present invention will be described hereinafter.

First of all, the entire arrangements of a rear projection type display including a rear projection screen according to an embodiment of the present invention will be described by referring to FIG. 1.

Figure 1:
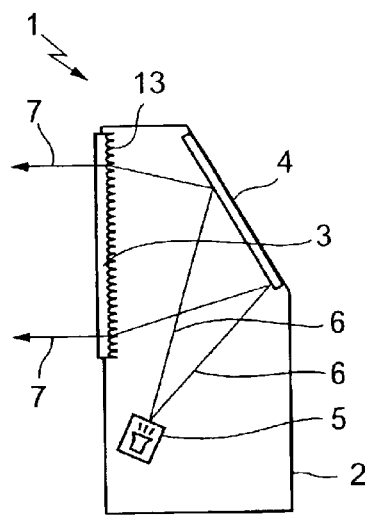
FIG. 1 is a view showing a rear projection type display including a rear projection screen according to an embodiment of the present invention.

As shown in FIG. 1, a rear projection type display 1 includes: a rear projection screen 3; a projector 5 for projecting light 6 on the rear projection screen 3; and a reflector 4 for reflecting the projected light 6 into the back-side surface of the rear projection screen 3. The rear projection screen 3, the projector 5 and the reflector 4, which are positioned as shown in FIG. 1, are contained within a cabinet 2. Namely, the rear projection screen 3 is set in a bored window made in the upper part of the front (observation-side) surface of the cabinet 2, and the projector 5 is placed at the lower part in the cabinet 2. The reflector 4 is placed at the upper part in the cabinet 2 so that it can reflect the light 6 projected from the projector 5, into the back-side surface of the rear projection screen 3.

Figures 2A, 2B:
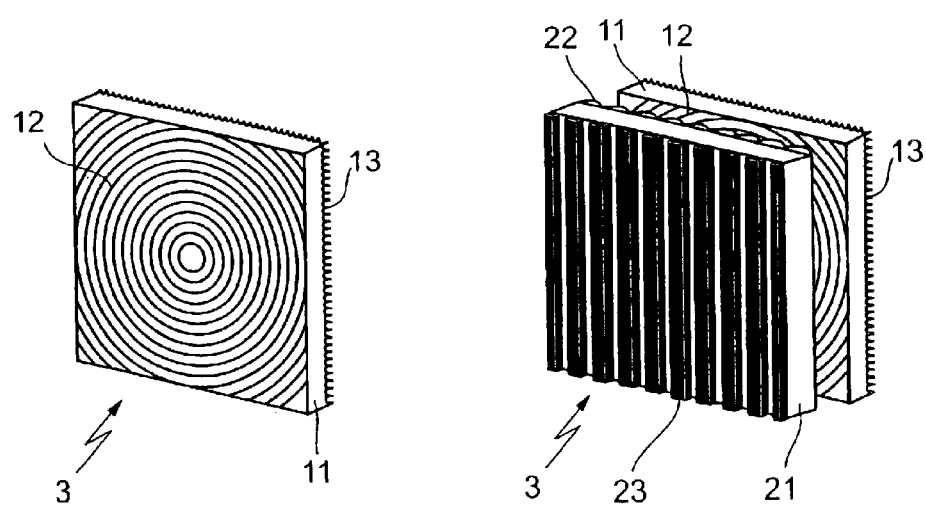
FIG. 2A is a view showing an example of the rear projection screen shown in FIG. 1.
FIG. 2B is a view showing another example of the rear projection screen shown in FIG. 1.
Figure 3:
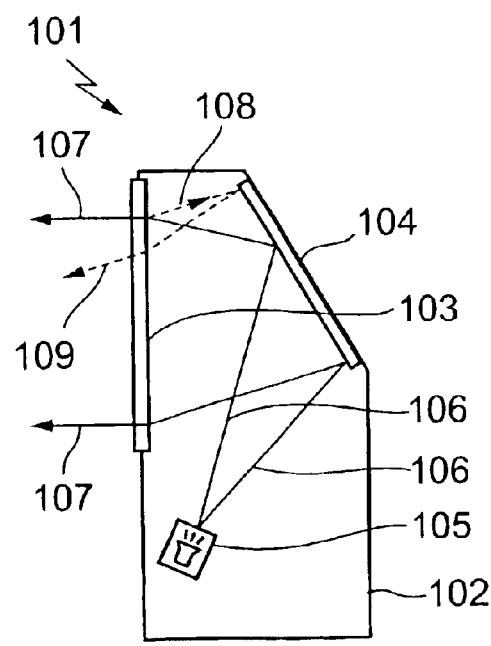
FIG. 3 is a view showing a rear projection type display including a conventional rear projection screen.
Figure 4:
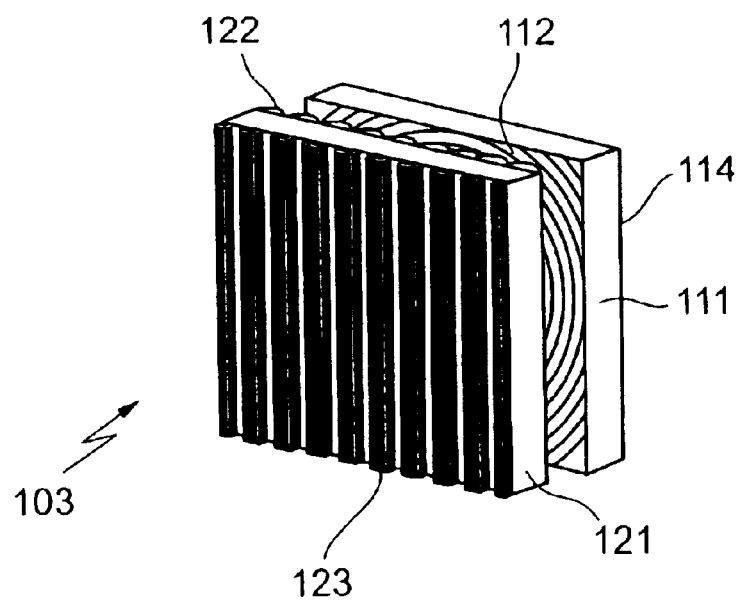
FIG. 4 is a view showing the conventional rear projection screen shown in FIG. 3.

FIG. 2A is a view showing an example of the rear projection screen 3 shown in FIG. 1. The rear projection screen 3 shown in this drawing is composed of a single Fresnel lens sheet 11 having the function of converging projected light entering from its back side and allowing the converged light to emerge from its observation side.

The Fresnel lens sheet 11 has a Fresnel lens 12 in the shape of a Fresnel convex lens or the like on its observation-side surface, and a matte surface 13 as its back-side surface. The Fresnel lens 12 may be formed integrally with the Fresnel lens sheet 11. In the case where the Fresnel lens sheet 11 is made from a transparent substrate sheet and a resin layer, the resin layer to be laminated to the transparent substrate sheet may be shaped into the Fresnel lens 12. In the latter case, a cured material layer formed by curing an ionizing-radiation-curing resin layer is used as the resin layer to be shaped into the Fresnel lens 12, and at least the surface of the transparent substrate sheet not facing to the cured material layer is matte-finished to give the matte surface 13.

The matte surface 13 of the Fresnel lens sheet 11 has a specified degree of matting and can show antireflection properties. Preferably, the Fresnel lens sheet 11 has a haze value in a specified range. More preferably, the matte surface 13 of the Fresnel lens sheet 11 has a gloss in a specified range.

Specifically, the Fresnel lens sheet 11 preferably has a haze value between 15% and 40%. When the haze value of the Fresnel lens sheet 11 is less than 15%, the matte surface 13 cannot fully show antireflection properties. On the other hand, when the haze value of the Fresnel lens sheet 11 is in excess of 40%, the image displayed has lowered definition and contrast. In this specification, the "haze value" refers to that defined in JIS K7105.

In addition, the matte surface 13 of the Fresnel lens sheet 11 preferably has a gloss in a specified range. In particular, it is preferable to make the 60° specular gloss defined in JIS K7105 of the matte surface 13 of the Fresnel lens sheet 11 between 20% and 45%. If the 60° specular gloss of the matte surface 13 is less than 20%, although the matte surface 13 can show antireflection properties, only a decreased amount of light passes through the Fresnel lens sheet 11. On the other hand, if the 60° specular gloss of the matte surface 13 exceeds 45%, it becomes difficult to neglect ghost images that are produced by projected light reflected from the back-side surface of the Fresnel lens sheet 11. It is also preferable to make the 20° specular gloss defined in JIS K7105 of the matte surface 13 of the Fresnel lens sheet 11 between 5% and 15%. If the 200 specular gloss of the matte surface 13 is less than 5%, although the matte surface 13 can show antireflection properties, only a decreased amount of light passes through the Fresnel lens sheet 11. On the other hand, when the 200 specular gloss of the matte surface 13 exceeds 15%, it becomes difficult to neglect ghost images that are produced by projected light reflected from the back-side surface of the Fresnel lens sheet 11.

A variety of methods can be employed to provide the matte surface 13 on the Fresnel lens sheet 11. An embossing die capable of providing a surface matted to a specified degree is preferably used to provide the matte surface 13 on the Fresnel lens sheet 11. In the case where the Fresnel lens sheet 11 is prepared as a laminate of a transparent substrate sheet and a resin layer, the transparent substrate sheet is matted to give the matte surface 13.

Although the matte surface 13 may be macroscopically flat, it can also be a surface having irregularities in a variety of shapes. The shapes of irregularities herein include: (1) the shape of a so-called fly-eye lens in which either isotropic or anisotropic unit lenses are arranged in the vertical and horizontal directions to form a matrix; and (2) the shape of a prismatic plane formed by arranging a plurality of prisms.

In the rear projection screen 3 having the above-described arrangements, if the Fresnel lens sheet 11 undergoes curling with changes in environmental conditions such as change in humidity, the image displayed is to have lowered definition. It is therefore preferable to use a material having extremely low water absorption for forming the Fresnel lens sheet 11. In the case where the Fresnel lens sheet 11 is prepared as a laminate of a transparent substrate sheet and a resin layer, it is preferable to form the transparent substrate sheet from a material having extremely low water absorption. Preferably, the water absorption defined in JIS K7209 of the material to be used for forming the Fresnel lens sheet 11 or the transparent substrate sheet, as determined by immersing the material in water at 23° C. for 24 hours, is not more than 0.2%. If a material having a water absorption (23° C., 24 hours) of more than 0.2% is used, the Fresnel lens sheet 11 absorbs water and curls to a non-negligible extent; this curling brings about the lowering of image definition. Specifically, in the case where a material having a water absorption (23° C., 24 hours) of not more than 0.2% is used, the Fresnel lens sheet 11 undergoes curling of only several tens millimeters for the width of 1000 mm when the Fresnel lens sheet 11 is hung down by supporting it only at its upper side. The curling in such a degree will cause a gap of only several millimeters between the Fresnel lens sheet 11 and the lenticular lens sheet 21. On the contrary, when a material having a water absorption (23° C., 24 hours) of approximately 0.5% is used, the Fresnel lens sheet 11 undergoes curling of approximately 100 mm for the width of 1000 mm. The curling in such a high degree cannot be neglected from the viewpoint of image definition.

The thickness of the Fresnel lens sheet 11 is not a significant factor for the prevention of curling that occurs when the Fresnel lens sheet 11 absorbs water. However, it is generally preferable that the Fresnel lens sheet 11 be thinner because it becomes easy to suppress the curling of the Fresnel lens sheet 11 when fixing the Fresnel lens sheet 11 in a frame. Moreover, by making the Fresnel lens sheet 11 thinner, it becomes possible to prevent the appearance of double images that is caused by projected light which is reflected from the lower part of the observation-side surface (Fresnel lens 12) of the Fresnel lens sheet 11 and is re-reflected from the back-side surface of the Fresnel lens sheet 11.

The thickness of the Fresnel lens sheet 11 (or the thickness of the transparent substrate sheet in the case where the Fresnel lens sheet 11 is a laminate of a transparent substrate sheet and a resin layer) is preferably between 0.2 mm and 1.5 mm. If this thickness is less than 0.2 mm, the function of supporting the Fresnel lens sheet 11 cannot fully be obtained. In addition, such a thickness is too small to give a matte surface on the Fresnel lens sheet 11 by embossing. On the other hand, when the thickness is in excess of 1.5 mm, the image displayed is to have lowered definition due to the appearance of double images or the like. In the case where the Fresnel lens sheet 11 is prepared by laminating a transparent substrate sheet and a resin layer, and is provided with a matte surface 13 by embossing the transparent substrate sheet while producing it with extrusion molding, the thickness of the transparent substrate sheet is preferably between about 0.5 mm and about 1.0 mm.

As mentioned previously, it is preferable to use a material having extremely low water absorption for forming the Fresnel lens sheet 11 or the transparent substrate sheet (a constituent of the Fresnel lens sheet 11). It is however a matter of course that Fresnel lens sheet 11 made from a material having low water absorption is apt to be electrically charged. Therefore, if the water absorption (23° C., 24 hours) of the Fresnel lens sheet 11 or that of the transparent substrate sheet (a constituent of the Fresnel lens sheet 11) is in the above-described range, it is preferable to subject the Fresnel lens sheet 11 to antistatic treatment. The antistatic treatment can be conducted by, for example, mixing an antistatic agent, directly applying or spraying an antistatic agent, or applying a composition containing an antistatic agent. Various parts of the Fresnel lens sheet 11 can be subjected to the antistatic treatment. However, in the case where the Fresnel lens sheet 11 is a laminate of a transparent substrate sheet and a resin layer, it is preferable to subject the exposed surface (the matte surface 13) of the transparent substrate sheet to the antistatic treatment.

The rear projection screen 3 shown in FIG. 2A is composed of the single Fresnel lens sheet 11. However, as shown in FIG. 2B, a lenticular lens sheet 21 may be placed on the observation side of the Fresnel lens sheet 11, which is situated on the back side of the rear projection screen 3. In the rear projection screen 3 shown in FIG. 2B, the Fresnel lens sheet 11 and the lenticular lens sheet 21 are positioned in close proximity; in general, they are closely fitted.

Since the arrangements of the Fresnel lens sheet 11 in the rear projection screen 3 shown in FIG. 2B is the same as that of the Fresnel lens sheet 11 in the rear projection screen 3 shown in FIG. 2A, it will not be described any more.

The lenticular lens sheet 21 is such that lenticular lenses 22 are arranged on the back-side surface (the surface facing to the Fresnel lens sheet 11) of the lenticular lens sheet 21 so that grooves will be vertically formed between the lenticular lenses. On the observation-side surface of the lenticular lens sheet 21, black stripes 23 are formed on those parts corresponding to the non-light-converging parts of the lenticular lenses 22 arranged on the back-side surface of the lenticular lens sheet 21. The black stripes 23 can prevent the reflection of light that enters from the observation-side surface. Instead of providing these black stripes 23, a light-absorbing layer made from a transparent, colored layer may be formed on the surfaces of the lenticular lenses 22 provided on the back-side surface of the lenticular lens sheet 21. The lenticular lenses 22 may be integrally formed with the lenticular lens sheet 21. In the case where the lenticular lens sheet 21 is made from a transparent substrate sheet and a resin layer, the resin layer to be laminated to the transparent substrate sheet may be shaped into the lenticular lenses 22.

Next, by referring to FIGS. 1 and 2, the actions of the rear projection type display 1 having the above-described arrangements will be described. In the rear projection type display 1, the reflector 4 reflects light 6 projected from the projector 5, into the back-side surface of the rear projection screen 3, as shown in FIG. 1. This incident light passes through the rear projection screen 3 to become imaging light 7. At this time, the back-side surface of the rear projection screen 3 is supposed to reflect a part of the incident light. However, the back-side surface of the rear projection screen 3 (i.e., the back-side surface of the Fresnel lens sheet 11) is matted to give the matte surface 13, so that substantially no reflection of the incident light occurs on this matte surface 13. Ghost images are thus hardly produced.

EXAMPLES

Example 1

A transparent polyester resin was subjected to extrusion molding, and one surface of the extrusion-molded sheet was matted by the use of an embossing roller. A transparent substrate sheet with a matte surface, having a haze value of 25%, a 60° specular gloss of 30%, a 20° specular gloss of 7% and a thickness of 0.5 mm was thus obtained as a substrate. Measurement of the haze value and that of the 60° and 20° specular glosses were made using a haze meter HR-100 manufactured by Murakami Color Research Laboratory and a gloss meter GM-260 manufactured by Murakami Color Research Laboratory, respectively.

To the non-matte-finished surface of this substrate was laminated a cured material layer formed by curing an ultraviolet-curing resin, shaped into a Fresnel lens, thereby obtaining a Fresnel lens sheet having a total thickness of 0.7 mm and a screen size (diagonal size) of 1524 mm (type 60).

A lenticular lens sheet having the same screen size as that of the Fresnel lens sheet was then brought into close contact with the Fresnel lens sheet with the lenticular lenses on the lenticular lens sheet facing the Fresnel lens on the Fresnel lens sheet, thereby obtaining a rear projection screen consisting of the two lens sheets (the matte surface of the Fresnel lens sheet became the back-side surface of the rear projection screen). By the use of this rear projection screen, a rear projection type display as shown in FIG. 1 was fabricated.

An image was displayed on the rear projection type display thus fabricated, and was visually observed. Although the shortest distance between the reflector and the rear projection screen (the distance in the horizontal direction at the upper part of FIG. 1) was made as short as 50 mm, the appearance of ghost images due to projected light reflected from the back-side surface of the Fresnel lens sheet was not observed. Moreover, the definition of the image displayed was satisfactorily high.

Example 2

A polycarbonate resin containing a light diffusing agent and one containing no light diffusing agent were subjected to two-layer extrusion molding to obtain a transparent substrate sheet, where the surface of the resin layer containing the light diffusing agent was matte.

A rear projection type display was fabricated in the same manner as in Example 1, provided that the above-prepared transparent substrate sheet was used as the substrate.

An image was displayed on this rear projection type display, and was visually observed. The appearance of ghost images due to projected light reflected from the back-side surface of the Fresnel lens sheet was not observed. However, the image displayed was found to have lowered definition, and the appearance of double images due to projected light reflected from the Fresnel lens was observed.

Comparative Example

A rear projection type display was fabricated in the same manner as in Example 1 except that a transparent substrate sheet made from an acrylic resin, having a haze value of 10%, a 60° specular gloss of 60% and a 20° specular gloss of 25% was used as the substrate.

An image was displayed on this rear projection type display, and was visually observed. As a result, the appearance of ghost images due to projected light reflected from the back-side surface of the Fresnel lens sheet was observed. (Results of Other Evaluations)

The Fresnel lens sheets used in Examples 1 and 2 and Comparative Example were immersed in water at 23° C. for 24 hours to determine their water absorption. The results were as follows: the water absorption of the Fresnel lens sheet in Example 1 was 0.1%, that of the Fresnel lens sheet in Example 2 was 0.1%, and that of the Fresnel lens sheet in Comparative Example was 0.5%.

The rear projection screens containing these Fresnel lens sheets were left for 168 hours (one week) in such an atmosphere that the temperature and the relative humidity were 40° C. and 90%, respectively. As a result, no change was observed in the rear projection screens of Examples 1 and 2. However, the Fresnel lens sheet in the rear projection screen of Comparative Example curled to cause a gap of approximately 5 mm at the maximum between the Fresnel lens sheet and the lenticular lens sheet in the rear projection screen. An image was displayed on the rear projection type display containing this rear projection screen of Comparative Example, and was visually observed. As a result, the image displayed was found to have extremely lowered definition.

What is claimed is:

1. A rear projection screen comprising a Fresnel lens sheet that converges projected light entering from a back side thereof and allows the converged light to emerge from an observation side thereof, wherein the Fresnel lens sheet has an observation-side surface forming a Fresnel lens and a back-side surface forming a matte surface, and the matte surface of the Fresnel lens sheet has a 60° specular gloss defined in JIS K7105 of 20 to 45%.

2. A rear projection screen comprising a Fresnel lens sheet that converges projected light entering from a back side thereof and allows the converged light to emerge from an observation side thereof, wherein the Fresnel lens sheet has an observation-side surface forming a Fresnel lens and a back-side surface forming a matte surface, and the matte surface of the Fresnel lens sheet has a 20° specular gloss defined in JIS K7105 of 5 to 15%.

3. The rear projection screen according to claim 1, wherein the matte surface of the Fresnel lens sheet has a 60° specular gloss defined in JIS K7105 of 20 to 45% and a 20° specular gloss defined in JIS K7105 of 5 to 15%.

4. A rear projection screen comprising a Fresnel lens sheet that converges projected light entering from a back side thereof and allows the converged light to emerge from an observation side thereof, wherein (1) the Fresnel lens sheet has an observation-side surface forming a Fresnel lens, a back-side surface forming a matte surface, and a haze value defined in JIS K7105 of 15 to 40%, (2) the Fresnel lens sheet includes a cured material layer formed by curing an ionizing-radiation-curing resin and a transparent substrate sheet laminated to the cured material layer; the Fresnel lens is formed in the cured material layer; and at least a surface of the transparent substrate sheet not facing to the cured material layer forms the matte surface, and (3) the transparent substrate sheet in the Fresnel lens sheet shows a water absorption of not more than 0.2% when determined by immersing it in water at 23° C. for 24 hours under JIS K7209.

5. The rear projection screen according to claim 1, wherein the Fresnel lens sheet includes a cured material layer formed by curing an ionizing-radiation-curing resin and a transparent substrate sheet laminated to the cured material layer; the Fresnel lens is formed in the cured material layer; and at least a surface of the transparent substrate sheet not facing to the cured material layer forms the matte surface.

6. The rear projection screen according to claim 5, wherein the transparent substrate sheet in the Fresnel lens sheet shows a water absorption of not more than 0.2% when determined by immersing it in water at 23° C. for 24 hours under JIS K7209.

7. The rear projection screen according to claim 1, wherein the Fresnel lens sheet has a thickness of 0.2 to 1.5 mm.

8. The rear projection screen according to claim 1, wherein the matte surface of the Fresnel lens sheet is subjected to antistatic treatment.

9. The rear projection screen according to claim 1, further comprising a lenticular lens sheet on the observation side of the Fresnel lens sheet.

10. A rear projection type display comprising:
the rear projection screen according to claim 1;
a projector that projects light on the rear projection screen; and
a reflector that reflects the light projected from the projector, into the back-side surface of the rear projection screen.

11. The rear projection screen according to claim 2, wherein the Fresnel lens sheet includes a cured material layer formed by curing an ionizing-radiation-curing resin and a transparent substrate sheet laminated to the cured material layer; the Fresnel lens is formed in the cured material layer; and at least a surface of the transparent substrate sheet not facing to the cured material layer forms the matte surface.

12. The rear projection screen according to claim 11, wherein the transparent substrate sheet in the Fresnel lens sheet shows a water absorption of not more than 0.2% when determined by immersing it in water at 23° C. for 24 hours under JIS K7209.

13. The rear projection screen according to claim 2, wherein the Fresnel lens sheet has a thickness of 0.2 to 1.5 mm.

14. The rear projection screen according to claim 2, wherein the matte surface of the Fresnel lens sheet is subjected to antistatic treatment.

15. The rear projection screen according to claim 2, further comprising a lenticular lens sheet on the observation side of the Fresnel lens sheet.

16. A rear projection type display comprising:
the rear projection screen according to claim 2;
a projector that projects light on the rear projection screen; and
a reflector that reflects the light projected from the projector, into the back-side surface of the rear projection screen.

17. A rear projection screen comprising a Fresnel lens sheet that converges projected light entering from a back side thereof and allows the converged light to emerge from an observation side thereof,
wherein the Fresnel lens sheet has an observation-side surface forming a Fresnel lens and a back-side surface forming a matte surface, and includes a cured material layer formed by curing an ionizing-radiation-curing resin and a transparent substrate sheet laminated to the cured material layer; the Fresnel lens is formed in the cured material layer; at least a surface of the transparent substrate sheet not facing to the cured material layer forms the matte surface, and the transparent substrate sheet in the Fresnel lens sheet shows a water absorption of not more than 0.2% when determined by immersing it in water at 23° C. for 24 hours under JIS K7209.

18. The rear projection screen according to claim 17, wherein the Fresnel lens sheet has a thickness of 0.2 to 1.5 mm.

19. The rear projection screen according to claim 17, wherein the matte surface of the Fresnel lens sheet is subjected to antistatic treatment.

20. The rear projection screen according to claim 17, further comprising a lenticular lens sheet on the observation side of the Fresnel lens sheet.

21. A rear projection type display comprising:
the rear projection screen according to claim 17;
a projector that projects light on the rear projection screen; and
a reflector that reflects the light projected from the projector, into the back-side surface of the rear projection screen.

* * * * *